(12) United States Patent
Barciet et al.

(10) Patent No.: US 11,585,379 B2
(45) Date of Patent: Feb. 21, 2023

(54) BEARING WITH REMOVABLE SEALING MODULE

(71) Applicant: Aktiebolaget SKF, Gothenburg (SE)

(72) Inventors: Damien Barciet, Lucy-le-Bois (FR); Vincent Bredoire, Pourrain (FR)

(73) Assignee: Aktiebolaget SKF, Gothenburg (SE)

(*) Notice: Subject to any disclaimer, the term of this patent is extended or adjusted under 35 U.S.C. 154(b) by 0 days.

(21) Appl. No.: 17/551,242

(22) Filed: Dec. 15, 2021

(65) Prior Publication Data

US 2022/0196073 A1    Jun. 23, 2022

(30) Foreign Application Priority Data

Dec. 22, 2020    (DE) .......................... 102020134674.3

(51) Int. Cl.
*F16C 19/38*    (2006.01)
*F16C 33/58*    (2006.01)
*F16C 33/78*    (2006.01)

(52) U.S. Cl.
CPC ........ *F16C 33/7826* (2013.01); *F16C 33/586* (2013.01); *F16C 33/783* (2013.01); *F16C 33/7886* (2013.01); *F16C 33/7896* (2013.01); *F16C 19/381* (2013.01)

(58) Field of Classification Search
CPC .......................... F16C 19/381; F16C 2300/14; F16C 2360/31; F16C 33/586; F16C 33/72; F16C 33/782; F16C 33/7823; F16C 33/7826; F16C 33/783; F16C 33/784; F16C 33/7866; F16C 33/7876; F16C 33/7886; F16C 33/7896; F16J 15/32; F16J 15/3216; F16J 15/322; F16J 15/3248; F16J 15/3252; F16J 15/3268; F03B 11/006; F03D 80/70
See application file for complete search history.

(56) References Cited

U.S. PATENT DOCUMENTS

| | | | | |
|---|---|---|---|---|
| 2,990,220 | A * | 6/1961 | Malone | B62D 55/15 384/486 |
| 9,334,901 | B2 * | 5/2016 | Schröppel | F03B 11/006 |
| 9,494,197 | B2 * | 11/2016 | Capoldi | F16C 33/7886 |
| 10,731,707 | B2 * | 8/2020 | Baumann | F16C 33/7823 |
| 11,486,444 | B2 * | 11/2022 | Capoldi | F16C 33/586 |
| 2019/0323554 | A1 | 10/2019 | Delaby et al. | |
| 2020/0011287 | A1 * | 1/2020 | Hofmann | F16C 25/045 |
| 2021/0140482 | A1 | 5/2021 | Capoldi et al. | |

FOREIGN PATENT DOCUMENTS

DE    102018213357 A1    10/2019

* cited by examiner

*Primary Examiner* — Alan B Waits
(74) *Attorney, Agent, or Firm* — Garcia-Zamor Intellectual Property Law; Ruy Garcia-Zamor; Bryan Peckjian (57) ABSTRACT

A bearing provides a first ring and a second ring capable of rotating concentrically relative to one another, and at least one seal provided with at least one sealing lip. The bearing further includes a sealing module providing a carrier reversibly secured to the first ring, the seal being mounted radially into contact with the carrier, a friction ring reversibly secured to the second ring, the sealing lip of the seal coming into contact with the friction ring, and at least one spacing element axially interposed between the friction ring and the second ring.

10 Claims, 5 Drawing Sheets

BEARING WITH REMOVABLE SEALING MODULE

CROSS-REFERENCE TO RELATED APPLICATIONS

This application claims priority to German Patent Application no. 102020134674.3, filed Dec. 22, 2020, the contents of which is fully incorporated herein by reference.

FIELD OF THE INVENTION

The present invention relates to the field of bearings. The invention notably relates to the field of large-diameter bearing having an inner ring and an outer ring arranged concentrically about an axis of rotation running in an axial direction.

BACKGROUND OF THE INVENTION

Such large-diameter bearings may be used for example in marine applications, for example in a tidal or marine turbine power station, or in a tunnel boring machine, or in a mining extraction machine or in a wind turbine.

A large-diameter bearing generally comprises two concentric inner and outer rings, and at least one row of rolling elements, such as rollers or balls, arranged between the rings. The bearing also comprises seals disposed between the inner and outer rings to define a closed space inside which the rolling elements are arranged.

Large-diameter rolling bearings are generally used in aggressive environments and in particular marine applications. Seals prevent exterior elements, such as dust, abrasive particles, water, and marine species, for example plankton and algae, from getting inside the bearing and damaging its components. Those exterior elements may also alter the seal itself, leading to a reduction in the seal service life.

Typically, seals are fixed to one of the inner and outer rings and comprise a sealing lip in sliding contact with a running surface of the other ring. Generally, a plurality of adjacent seals is provided on the bearing front side, which is directly in contact with the aggressive environments, for example with the saltwater. For example, it is possible to refer to the patent application DE102018213357 (SKF).

After several months or years of use, the seals running surface wears. The inner or outer ring of the rolling bearing including such running surface must be changed. This increases the maintenance costs of the rolling bearing.

Indeed, the rings of rolling bearings used in slewing bearings or bearings for tunnellers for example are quite expensive, due to the material used for those rings that has to be corrosion resistant as well as hard to limit wear.

Otherwise, maintenance operations are expensive and required the associated machine to be shut down for a long period of time.

One aim of the present invention is to overcome these drawbacks.

SUMARRY OF THE INVENTION

The invention relates to a bearing comprising a first ring and a second ring capable of rotating concentrically relative to one another, and at least one seal provided with at least one sealing lip.

According to a first general feature, the bearing further comprises a sealing module comprising a carrier removably secured to the first ring, and a friction ring removably secured to the second ring. The seal is mounted radially into contact with the carrier. The sealing lip of the seal comes into contact with the friction ring.

The sealing module further comprises at least one spacing element axially interposed between the friction ring and the second ring.

The sealing device forms a cartridge seal that can be easily fully removed without disassembling the bearing rings during a maintenance operation. The seal or the seals of the sealing module are not mounted on one of the bearing rings as it is the case in the existing solutions and can therefore be easily removed and replaced during a maintenance operation. This facilitates maintenance and reduces downtime for the change of seal(s).

Besides, during a maintenance operation, the spacing element may be removed without replacing it which allows each seal to have a new running surface on the friction ring. As a matter of fact, with the removing of the spacing element, the friction ring is axially shifted with respect to the seal(s). The friction area of the seal(s) on the friction ring is also axially shifted. This increases the service life of the friction ring.

An axial gap may be provided between the friction ring of the sealing module and the second ring, the size of the axial gap being equal to or greater than the axial thickness of the spacing element of the sealing module.

The seal of the sealing module may comprise an annular heel mounted radially into contact with the carrier and the sealing lip coming into contact with the friction ring. The sealing lip may project from the heel.

The bearing may further comprise at least one row of rolling elements arranged between first and second raceways of the first and second rings.

Advantageously, the first ring may comprise at least one first rolling ring provided with the first raceway, and a first sealing ring secured to the first rolling ring. In this case, the carrier of the sealing module is removably secured to the first sealing ring axially on the side opposite to the first rolling ring.

With such first sealing ring, conventional ring without specific machining operations may be used for the first rolling ring.

Advantageously, the second ring may comprise at least one second rolling ring provided with the second raceway, and a second sealing ring secured to the second rolling ring. In this case, the friction ring of the sealing module is removably secured to the second sealing ring axially on the side opposite to the second rolling ring.

With such second sealing ring, conventional ring without specific machining operations may be used for the second rolling ring.

The spacing element of the sealing module may be axially interposed between the friction ring and the second sealing ring of the second ring.

In one advantageous embodiment, the bearing further comprises at least one sealing element radially arranged between the first sealing ring and the second sealing ring, and axially located between the sealing module and the first and second rolling rings. The sealing element enables to limit intrusion of exterior elements towards the first and second rolling rings during a maintenance operation with a full removal of the sealing device.

The sealing module may further comprise a plurality of fixing screws extending through the friction ring and the spacing element and engaged inside threaded holes of the second ring. The threaded holes may be provided onto the second sealing ring of the second ring.

The friction ring of the sealing module may be provided with an axial portion onto which the sealing lip of the seal comes into contact, and with a radial portion, the spacing element being axially interposed between the radial portion and the second ring.

The carrier of the sealing module may be provided with an axial portion against which the seal radially comes into contact, and with a radial portion extending towards the friction ring.

In one embodiment, the carrier of the sealing module is mounted in an annular groove of the first sealing ring. The groove may be formed onto the first sealing ring of the first ring.

BRIEF DESCRIPTION OF THE FIGURES

The present invention and its advantages will be better understood by studying the detailed description of a specific embodiment given by way of a non-limiting example and illustrated by the appended drawings on which:

FIG. 2 is a detail view of FIG. 1, FIGS. 3 to 7 are cross-sections showing the disassembly and the reassembly of a sealing module of the rolling bearing of FIG. 1.

DETAILED DESCRIPTION OF THE INVENTION

Figure 1:
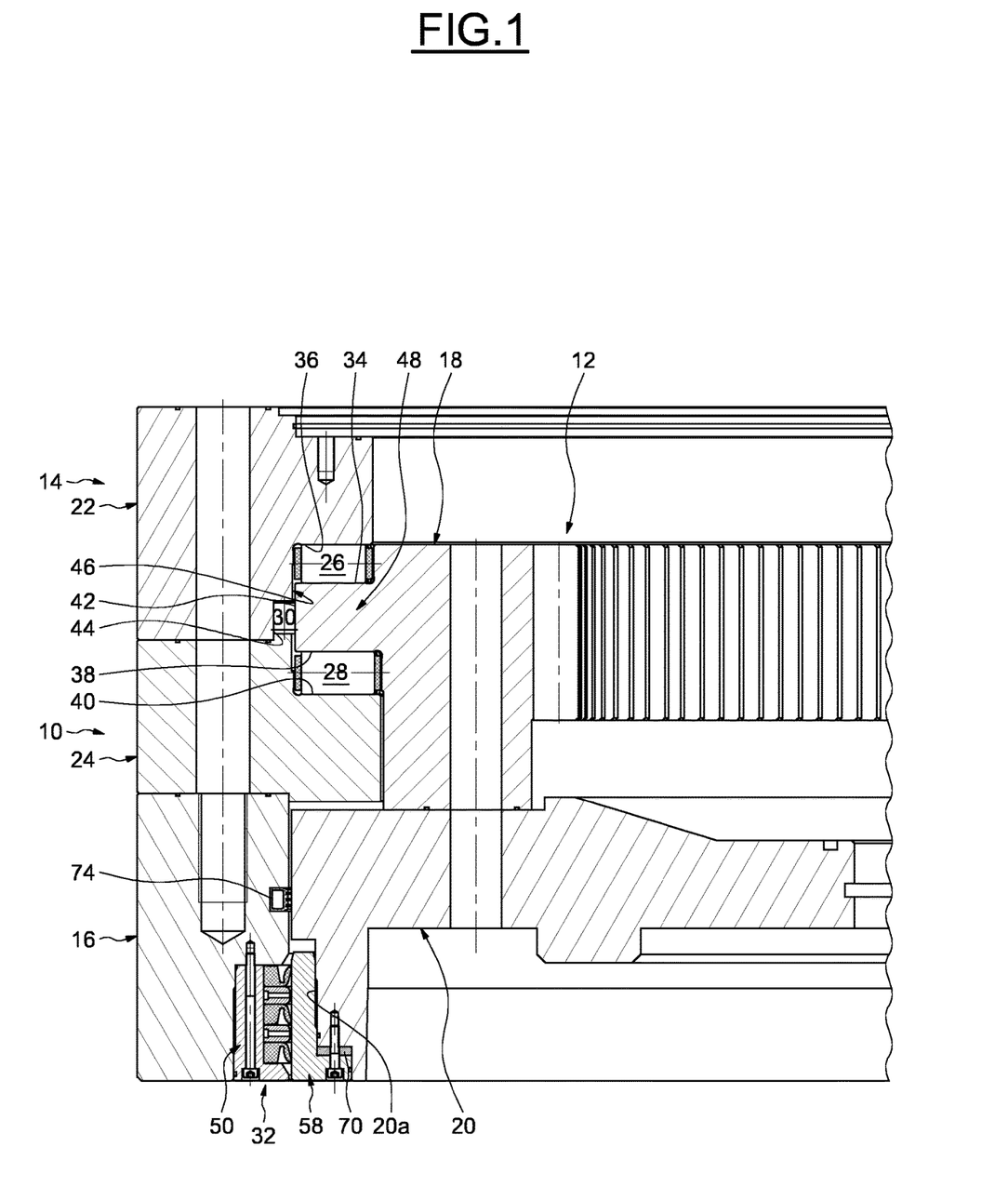
FIG. 1 is a partial cross-section of a rolling bearing according to an example of the invention in a first position.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. In this example, the inner ring 12 is a rotative ring and the outer ring 10 is a non-rotative ring. The rolling bearing may for example be used in a tunnel boring machine, a wind turbine or any other applications using a large diameter rolling bearing.

The outer and inner rings 10, 12 are concentric and extend axially along the bearing rotation axis (not shown) which runs in an axial direction. The rings 10, 12 are of the solid type.

The outer ring 10 comprises a rolling ring 14 and a sealing ring 16 secured to the rolling ring 14. The inner ring 12 also comprises a rolling ring 18 and a sealing ring 20 secured to the rolling ring 18. The sealing ring 16 of the outer ring radially surrounds the sealing ring 20 of the inner ring.

The rolling ring 14 of the outer ring is formed as a split ring and comprises a first ring 22 and a second ring 24 stacked one relative to the other in the axial direction. Each of the first and second rings 22, 24 of the rolling ring is provided with a plurality of aligned through-holes (not referenced) in order to be joined by screws (not shown).

In the illustrated example, the rolling bearing also comprises two rows of axial rollers 26, 28 which are arranged between the rolling ring 14 of the outer ring and the rolling ring 18 of the inner ring in order to form an axial thrust. The rolling bearing further comprises a row of radial rollers 30 which are arranged between the rolling rings 14, 18 to form a radial thrust.

As will be described later, the rolling bearing also comprises a sealing module 32 removably attached to the sealing rings 16, 20 of the inner and outer rings.

The rollers 26, 28, 30 of one row are identical to one another. Each roller 26, 28, 30 comprises a cylindrical outer rolling surface. The axis of rotation of each roller 30 is parallel to the axis of the bearing and perpendicular to the axes of each of the rollers 26, 28.

The rollers 26 are arranged axially between annular radial raceways 34, 36 respectively formed on the rolling rings 18, 14. The raceways 34, 36 face each other in the axial direction.

The rollers 28 are arranged axially between annular radial raceways 38, 40 respectively formed on the rolling rings 18, 14. The raceways 38, 40 axially face each other. The rows of rollers 26, 28 are spaced apart from each other in the axial direction.

The rollers 30 are arranged radially between annular axial raceways 42, 44 respectively formed on the rolling rings 18, 14. The raceways 42, 44 face each other in the radial direction. The row of rollers 30 is radially offset outwards with respect to the rows of rollers 26, 28. The row of rollers 30 is axially located between the rows of rollers 26, 28.

The rolling ring 14 of the outer ring comprises an annular groove 46 opening in a radial direction inwardly towards the rolling ring 18 of the inner ring. The rolling ring 18 comprises an annular protruding nose 48 engaging into the annular groove 46. The nose 48 extends radially outwards. The protruding nose 48 protrudes radially from an outer cylindrical surface of the rolling ring 18.

The rows of rollers 26, 28 are arranged axially between the nose 48 and the groove 46. The rows of rollers 26, 28 are disposed on each side of the nose 48. The radial raceways 34, 38 are located on the nose 48. The radial raceways 36, 40 are located on the groove 46.

The row of rollers 30 is arranged radially between the nose 48 and the groove 46. The axial raceways 42, 44 are respectively located on the nose 48 and the groove 46. An outer cylindrical surface of the nose 48 delimits the axial raceway 42. An axial bottom of the groove 46 delimits the axial raceway 44.

In the illustrated example, the rolling ring 18 of the inner ring is made in one part. Alternatively, the rolling ring 18 may be divided in the axial direction in at least two separate parts secured together. In another variant, the nose 48 may be made separately from the main part of the inner ring.

As previously mentioned, the rolling ring 14 of the outer ring is divided in the axial direction in two separate parts, the first ring 22 and the second ring 24. The first and second rings 22, 24 delimit together the groove 46.

The raceways 36, 40, 44 of the outer ring are provided on the rolling ring 14. The raceways 34, 38, 42 of the inner ring are provided on the rolling ring 18. The sealing rings 16, 20 are deprived of raceway.

The sealing ring 16 of the outer ring is mounted axially into contact against a radial frontal face of the rolling ring 14. The sealing ring 16 protrudes axially with regard to the rolling ring 14. The sealing ring 16 is secured to the rolling ring 14 with the screws used to join together the first and second rings 22, 24 of the rolling ring.

The sealing ring 20 of the inner ring is also secured to the rolling ring 18 with screws (not shown). The sealing ring 20 is mounted axially into contact against a radial frontal face of the rolling ring 18. The sealing ring 20 protrudes axially with regard to the rolling ring 18. As previously mentioned, the sealing ring 16 radially surrounds the sealing ring 20. A radial gap (not referenced) is provided between the sealing rings 16, 20.

Each of the sealing rings 16, 20 may have an annular form or may be segmented in the circumferential direction. Each of the sealing rings 16, 20 may be made of stainless steel or treated steel with a painting or anti-corrosion treatment.

Figure 2:
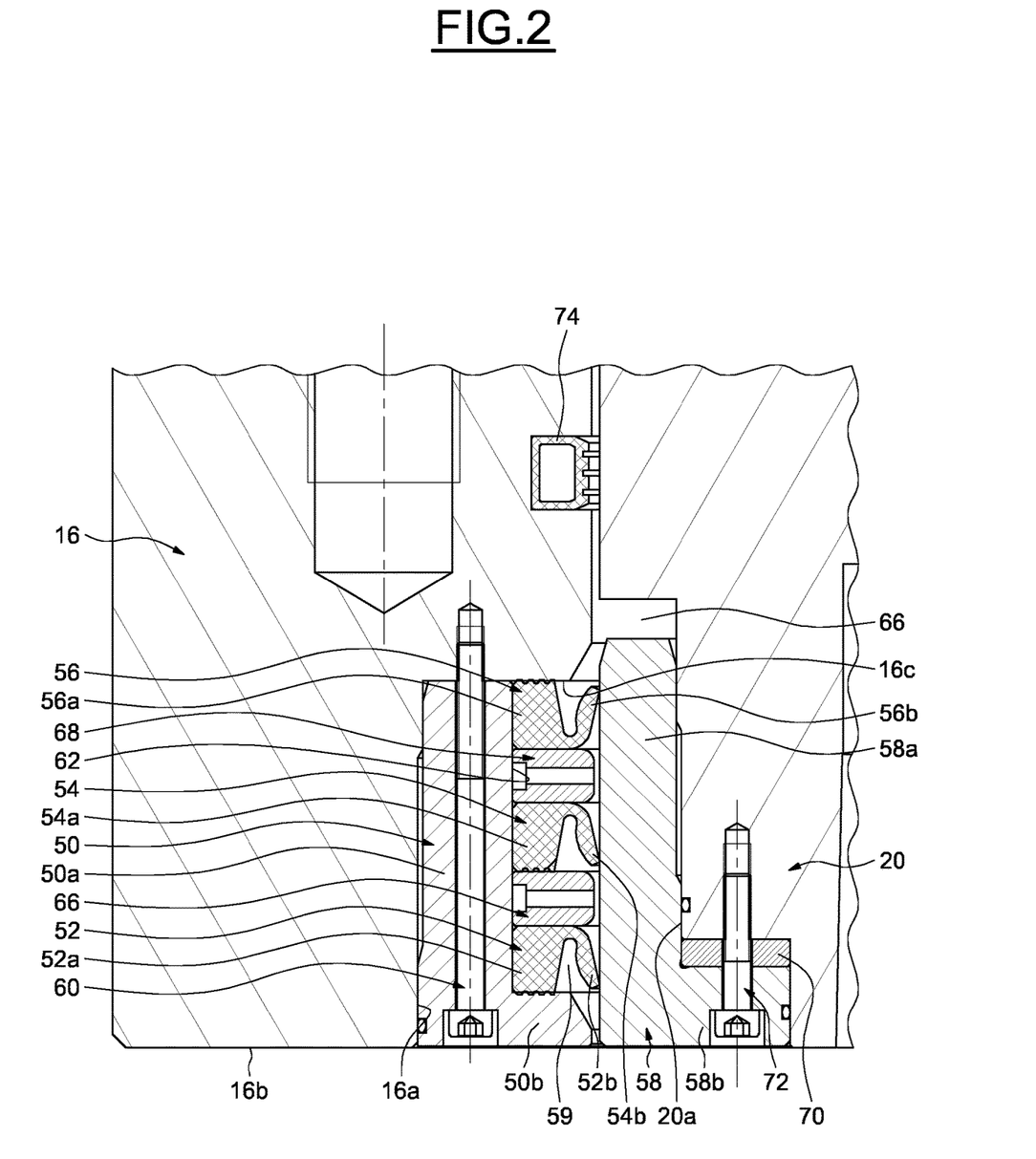

As shown more clearly on FIG. 2, the sealing module 32 comprises a carrier 50 removably attached or secured to the sealing ring 16 of the outer ring, a plurality of seals 52, 54, 56 radially mounted into contact with the carrier, and a friction ring 58 removably secured to the sealing ring 20 of the inner ring. The carrier 50 radially surrounds the friction ring 58.

In the orientation of the rolling bearing as shown on FIG. 2 with the bearing axis extending vertically, the carrier 50 bears the seals 52, 54 and 56. The carrier 50 and the friction ring 58 delimit together an annular radial space 59 inside which are disposed the seals 52, 54 and 56.

The carrier 50 is mounted into an annular groove 16a formed into the bore of the sealing ring 16. The groove 16a is centered on the bearing rotation axis. Diameter of bore of the sealing ring 16 is smaller than diameter of groove 16a. The groove 16a opens on a radial lateral face 16b of the sealing ring which is axially opposite to the rolling ring 14. The groove 16a is axially delimited by a radial shoulder 16c connected to the bore of the sealing ring 16.

The carrier 50 is mounted into the groove 16a of the sealing ring. The carrier 50 radially comes into contact with the groove 16a. The carrier 50 axially abuts against the radial shoulder 16c of the groove. The carrier 50 does not protrude axially outwards with respect to the lateral face 16b of the sealing ring. In the illustrated example, the carrier 50 is flush with the lateral face 16b.

The carrier 50 is secured to the sealing ring 16 axially on the side opposite to the rolling ring 14 (FIG. 1). In the illustrated example, the sealing module 32 comprises a plurality of screws 60 to removably secure the carrier 50 to the sealing ring 16. The screws 60 extend axially through the carrier 50 and are engaged inside threaded holes (not referenced) of the sealing ring 16 of the outer ring. The screws 60 are spaced apart in the circumferential direction.

The carrier 50 comprises an annular axial portion 50a and an annular radial portion 50b extending radially inwards. The radial portion 50b extends radially a first free end of the axial portion 50a towards the friction ring 38. The radial portion 50b is axially located on the exterior side of the rolling bearing.

The axial portion 50a of the carrier radially comes into contact with the groove 16a of the sealing ring 16. The axial portion 50a of the carrier also axially abuts against the radial shoulder 16c of the groove of the sealing ring. More precisely, a second free end of the axial portion 50a, which is axially opposite to the first end, axially abuts against the radial shoulder 16c. The screws 60 extend axially through the axial portion 50a of the carrier.

The friction ring 58 is secured to the sealing ring 20 of the inner ring axially on the side opposite to the rolling ring 18. The friction ring 58 is mounted on the outer surface 20a of the sealing ring. The friction ring 58 radially comes into contact with the outer surface 20a. In the illustrated example, the outer surface 20a of the sealing ring has a stepped shape to facilitate the mounting of the friction ring 58. The friction ring 58 does not protrude axially outwards with respect to the lateral face 16b of the sealing ring of the outer ring. In the illustrated example, the friction ring 58 is flush with the lateral face 16b.

The friction ring 58 comprises an annular axial portion 58a and an annular radial portion 58b extending radially inwards. The axial portion 58a is mounted on the outer surface 20a of the sealing ring. The bore of the axial portion 58a radially comes into contact with the outer surface 20a of the sealing ring. The radial portion 58b extends radially a free end of the axial portion 58a. The radial portion 58b is axially located on the exterior side of the rolling bearing.

As will be described later, an axial gap 66 is provided between the friction ring 58 and the sealing ring 20 of the inner ring. The axial gap 66 is provided between the axial portion 58a of the friction ring and the sealing ring 20.

As previously mentioned, each seal 52, 54, 56 is supported by the carrier 50. Each seal 52, 54 and 56 is mounted into the bore 62 of the axial portion 50a of the carrier 50. The seal 52 is axially located on the exterior side of the rolling bearing, the seal 56 is axially located on the side of the sealing ring 16, and the seal 54 is axially disposed between these two seals.

Each seal 52, 54, 56 is provided with an annular heel 52a, 54a, 56a and with an annular friction lip 52b, 54b, 56b projection from the heel. In the illustrated example, each friction lip 52b, 54b and 56b extends inwardly from the heel 52a, 54a and 56a. Here, each friction lip 52b, 54b and 56b extends obliquely. In the illustrated example, the lips 52b, 54b extends obliquely outwards while the lips 56b extends obliquely inwards. In the illustrated example, the lips 52b, 54b prevent the exterior pollutants from entering inside the rolling bearing and the lip 56b prevents the lubricant from coming out.

The heel 52a, 54a, 56a of each seal is mounted in radial contact against the bore 62 of the axial portion 50a of the carrier 50. The heel 52a axially comes into contact with the radial portion 50b of the carrier. The heel 56a axially comes into contact with the radial shoulder 16c of the groove of the sealing ring.

The lip 52b, 54b, 56b of each seal comes into friction contact with the friction ring 58. The contact between each lip 52b, 54b, 56b and the friction ring 58 is radial. The lips 52b, 54b, 56b are flexible in the radial direction. Preferably, the free end of each lip has a triangular shape in cross-section in order to reduce friction.

The lip 52b, 54b, 56b of each seal comes into friction contact with the axial portion 58 of the friction ring. In the illustrated example, the lips 52b, 54b, 56b come into friction contact with the outer surface of the axial portion 58 of the friction ring. In the illustrated example, the seals 52, 54 and 56 are identical to each other. Alternatively, the seals 52, 54 and 56 may be different to one another. In the illustrated example, the sealing device 32 comprises three seals 52, 54 and 56. The number of seals may be different. For example, the sealing device 32 may comprise at least two seals. The seals 52, 54 and 56 may be made of elastomeric material, for example polyurethane.

The rolling bearing also comprises at least one additional seal (not shown), which is provided between the rolling ring 18 of the inner ring and the rolling ring 14 of the outer ring, to delimit together with the seal 56 a closed space inside which are located the rows of rollers 26, 28 and 30 and the lubricant.

The sealing module 32 also comprises spacers or shims 66, 68 located into the radial space 59 delimited between the carrier 50 and the friction ring 38. The shims 66, 68 are supported by the carrier 50. The carrier 50 bears the seals 52, 54, 56 and the shims 66, 68. Each shim 66, 68 is axially interposed between two successive seals. The shims 66, 68 remain radially spaced apart from the friction ring 58. The shims 66, 68 may be annular. Each shim 66, 68 is axially interposed between the heels 52a, 54a and 54a, 56a of two successive seals. Each shim 66, 68 is mounted in the bore 62 of the axial portion 50a of the carrier 50.

The sealing module 32 further comprises a spacer 70 axially interposed between the friction ring 58 and the sealing ring 20 of the inner ring. The friction ring 58 is axially spaced apart from the sealing ring 20 by the spacer 70. The spacer 70 is axially interposed between the friction ring 58 and a frontal surface of the sealing ring 20 which is axially on the side opposite to the rolling ring 18 (FIG. 1). The spacer 70 is axially interposed between the radial portion 58b of the friction ring and the sealing ring 20. The spacer 70 may have an annular form or may be segmented in the circumferential direction. For example, the spacer 70 may be made of metal, such as steel, or be made of plastic material.

As previously mentioned, the friction ring 58 is removably secured to the sealing ring 20. To this end, in the illustrated example, the sealing module 32 comprises a plurality of screws 72. The screws 72 extend axially through the friction ring 58 and the spacer 70, and are engaged inside threaded holes (not referenced) of the sealing ring 20 of the inner ring. The screws 72 extend axially through the radial portion 58b of the friction ring. The screws 72 are spaced apart in the circumferential direction.

The rolling bearing further comprises one sealing element 74 radially arranged between the sealing ring 16 of the outer ring and the sealing ring 20 of the inner ring. The sealing element 74 is axially located between the sealing module 32 and the first and second rolling rings 14, 18. The sealing element 74 enables to limit intrusion of exterior elements towards the rows of rollers 26, 28, 30 during a maintenance operation. The sealing element 74 closes the radial gap between the sealing rings 16, 20.

In the illustrated example, the sealing element 74 is mounted into an annular groove (not referenced) formed into the bore of the sealing ring 16. Alternatively, the sealing element 74 may be mounted into an annular groove formed onto the outer surface of the sealing ring 20. In the illustrated example, the sealing element 74 is of the labyrinth type. Alternatively, the sealing element 74 may be of the friction type.

During a maintenance operation, the method for disassembling and reassembling the sealing module 32 could be done as follow.

Figure 3:
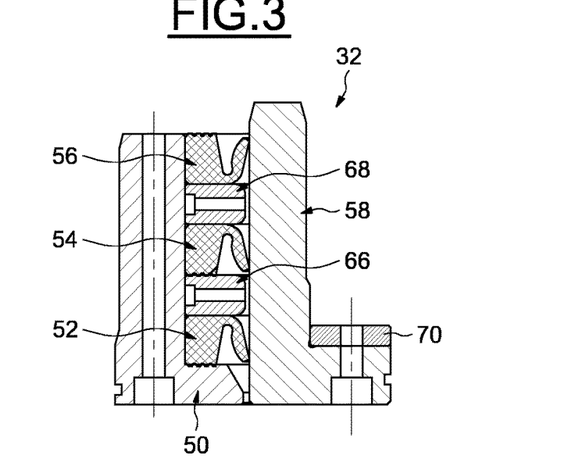

In a first step, the screws 60, 72 are removed and the sealing module 32 is fully removed and positioned on the ground as shown on FIG. 3.

Figure 4:
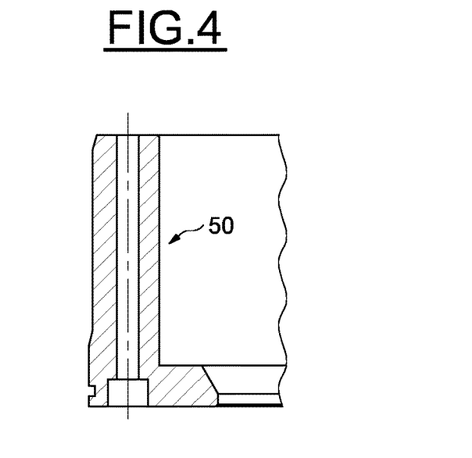

In a second step, all the elements of the sealing module 32 are disassembled. In a third step shown on FIG. 4, the carrier 50 is positioned alone on the ground.

Figure 5:
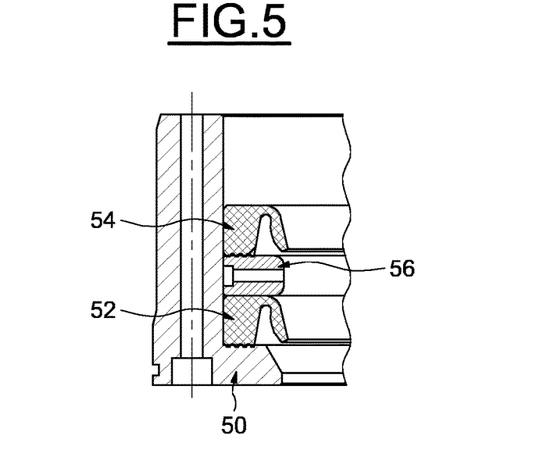
Figure 6:
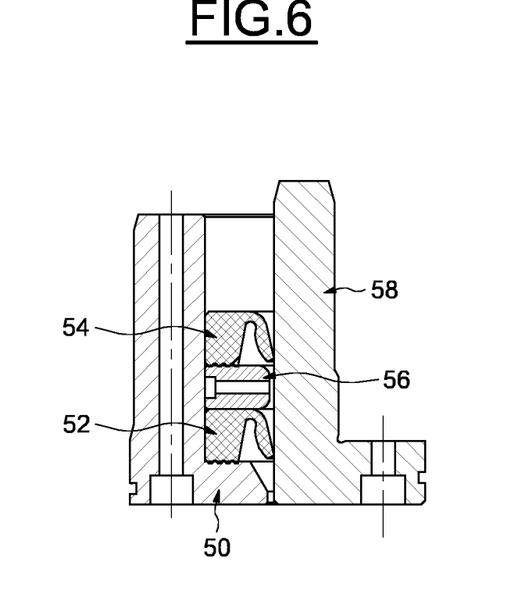

Then, in a fourth step shown on FIG. 5, new seals 52, 54 and the shim 66 are positioned on the carrier 50. In a fifth step shown on FIG. 6, the friction ring 58 is positioned inside the bore of the carrier 50 so that the lips of the seals 52, 54 are well positioned.

Figure 7:
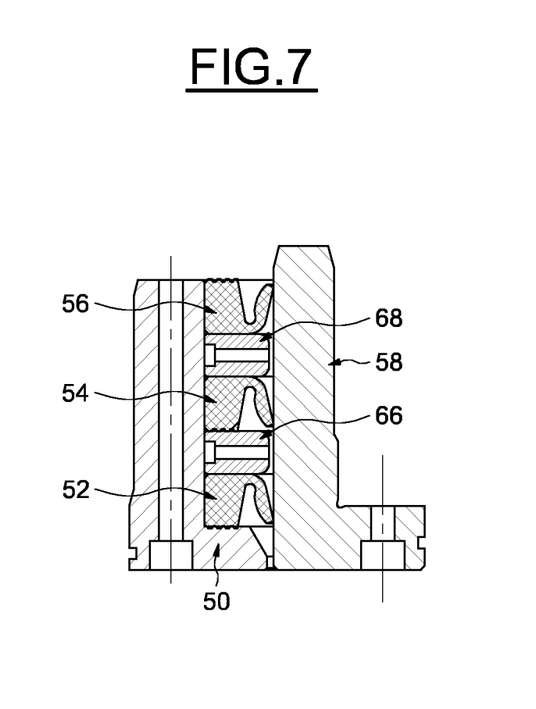

Then, in a sixth step shown on FIG. 7, the shim 68 and a new seal 56 are positioned on the carrier 50. The carrier 50 bears the new seals 52, 54 and 56 and the shims 66, 68.

Figure 8:
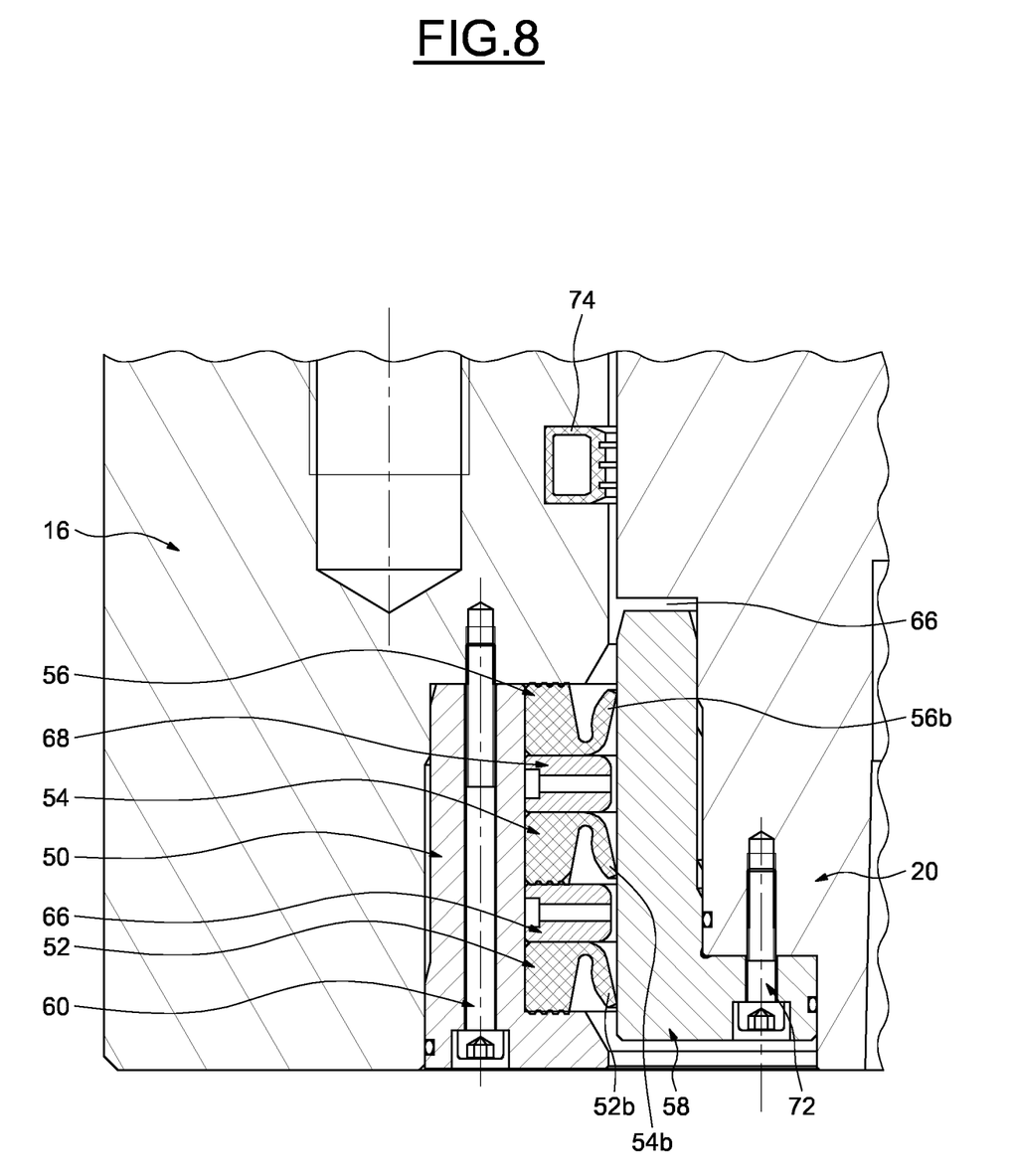
FIG. 8 is a partial cross-section of the rolling bearing of FIG. 1 in a second position.

Finally, in a seventh step, the entire sealing module 32 with new seals is repositioned and secured to the sealing rings 16, 20 of the outer and inner rings with the screws 60, 72 as shown on FIG. 8. The spacer 70 (FIG. 2) is not reused to shift the contact area of the new seals 52, 54 and 56 with the friction ring 58.

As a matter of fact, with regard to the first position of the friction ring 58 with the spacer 70 as shown on FIG. 2, the friction ring 58 is axially displaced relative to the seals 52, 54 and 56 in the second position as shown on FIG. 8. Each lip 52b, 54b and 56b of the seals comes into contact with a new running surface of the friction ring 58.

In this second position with no spacer, the friction ring 58 axially abuts directly against the sealing ring 20 of the inner ring. The radial portion 58b of the friction ring abuts directly against the sealing ring 20.

The size of the axial gap 66 initially provided between the friction ring 58 and the sealing ring 20 as shown on FIG. 2 is greater than the axial thickness of the spacer 70 so that the friction ring 58 may be axially shifted. In the illustrated example, a small axial gap 66 subsists in the second position of the friction ring 58. Alternatively, the size of the axial gap 66 initially provided between the friction ring 58 and the sealing ring 20 may be equal to the axial thickness of the spacer 70.

In the disassembling and reassembling method previously described a replacement of the old seals by new seals is achieved. Alternatively, it could be possible to detach the sealing device from the sealing rings 16, 20 of the outer and inner rings only to remove the spacer 70, i.e. without replacement of the seals.

In the illustrated example, both the outer and inner rings 10, 12 comprise a rolling ring 14, 18 and a sealing ring 16, 20 secured to the rolling ring. Alternatively, the outer and inner rings 10, 12 may be deprived of the sealing rings. In this case, the friction ring 58 is removably secured to the rolling ring 18, and the carrier 50 is removably secured to the rolling ring 14.

As previously mentioned, in the illustrated example, the first ring 10 is the fixed outer ring whereas the second ring 12 is the rotative inner ring. As an alternative, it could be possible to provide a reversed arrangement with the first ring forming the fixed inner ring and the second ring forming the rotative outer ring. In this case, the friction ring may be removably secured to the outer ring, and the carrier may be removably secured to the inner ring.

In the described examples, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be provided with a sliding bearing having no rolling elements.

The invention claimed is:

1. A bearing comprising:
   a first ring and a second ring capable of rotating concentrically relative to one another,
   at least one seal provided with at least one sealing lip, and
   a sealing module, wherein
      the sealing module includes a carrier removably secured to the first ring, the seal being mounted radially into contact with the carrier,
      a friction ring removably secured to the second ring, the sealing lip of the seal coming into contact with the friction ring, and
      at least one spacing element axially interposed between the friction ring and the second ring.

2. The bearing according to claim 1, further comprising at least one row of rolling elements arranged between first and second raceways of the first and second rings.

3. The bearing according to claim 2, wherein the first ring comprises at least one first rolling ring provided with the first raceway, and a first sealing ring secured to the first rolling ring, the carrier of the sealing module being removably secured to the first sealing ring axially on the side opposite to the first rolling ring.

4. The bearing according to claim 3, further comprising at least one sealing element radially arranged between the first sealing ring and the second sealing ring, and axially located between the sealing module and the first and second rolling rings.

5. The bearing according to claim 2, wherein the second ring comprises at least one second rolling ring provided with the second raceway, and a second sealing ring secured to the second rolling ring, the friction ring of the sealing module being removably secured to the second sealing ring axially on the side opposite to the second rolling ring.

6. The bearing according to claim 5, wherein the spacing element of the sealing module is axially interposed between the friction ring and the second sealing ring of the second ring.

7. The bearing according to claim 1, wherein the friction ring of the sealing module is provided with an axial portion onto which the sealing lip of the seal comes into contact, and with a radial portion, the spacing element being axially interposed between the radial portion of the friction ring and the second ring.

8. The bearing according to claim 1, wherein the carrier of the sealing module is provided with an axial portion against which the seal radially comes into contact, and with a radial portion extending towards the friction ring.

9. The bearing according to claim 1, wherein the carrier of the sealing module is mounted in an annular groove of the first ring.

10. The bearing according to claim 1, wherein an axial gap is provided between the friction ring of the sealing module and the second ring, the size of the axial gap being equal to or greater than the axial thickness of the spacing element of the sealing module.

* * * * *